Nov. 6, 1962 G. A. RUTLEDGE 3,062,430
CARTON WITH DETACHABLE PANEL CONSTRUCTION
Filed Aug. 28, 1959 3 Sheets-Sheet 1
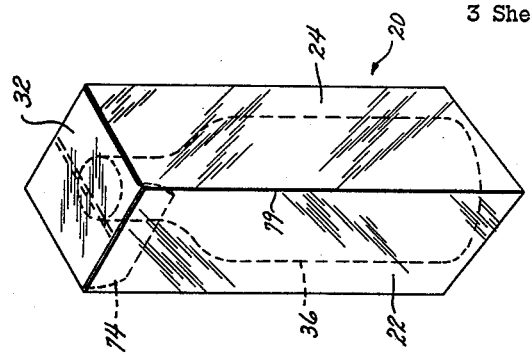
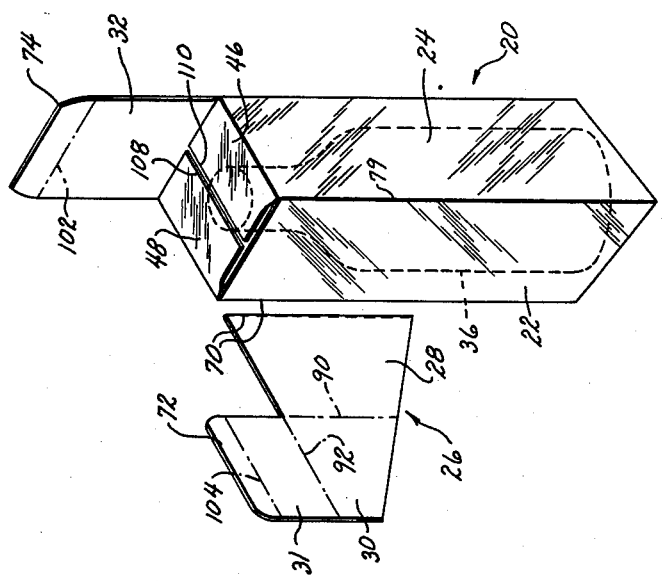
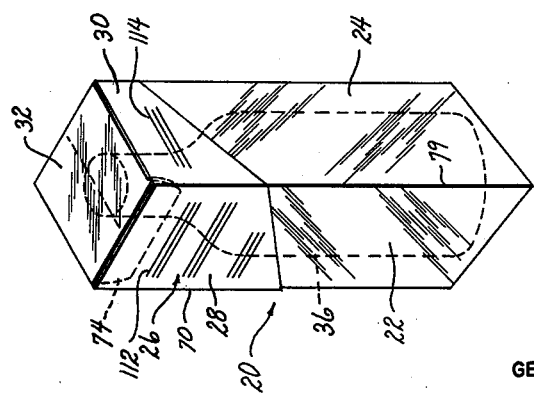
INVENTOR
GEORGE A. RUTLEDGE
BY
*Glenn & Jackson*
HIS ATTORNEYS Nov. 6, 1962  G. A. RUTLEDGE  3,062,430
CARTON WITH DETACHABLE PANEL CONSTRUCTION
Filed Aug. 28, 1959  3 Sheets-Sheet 2
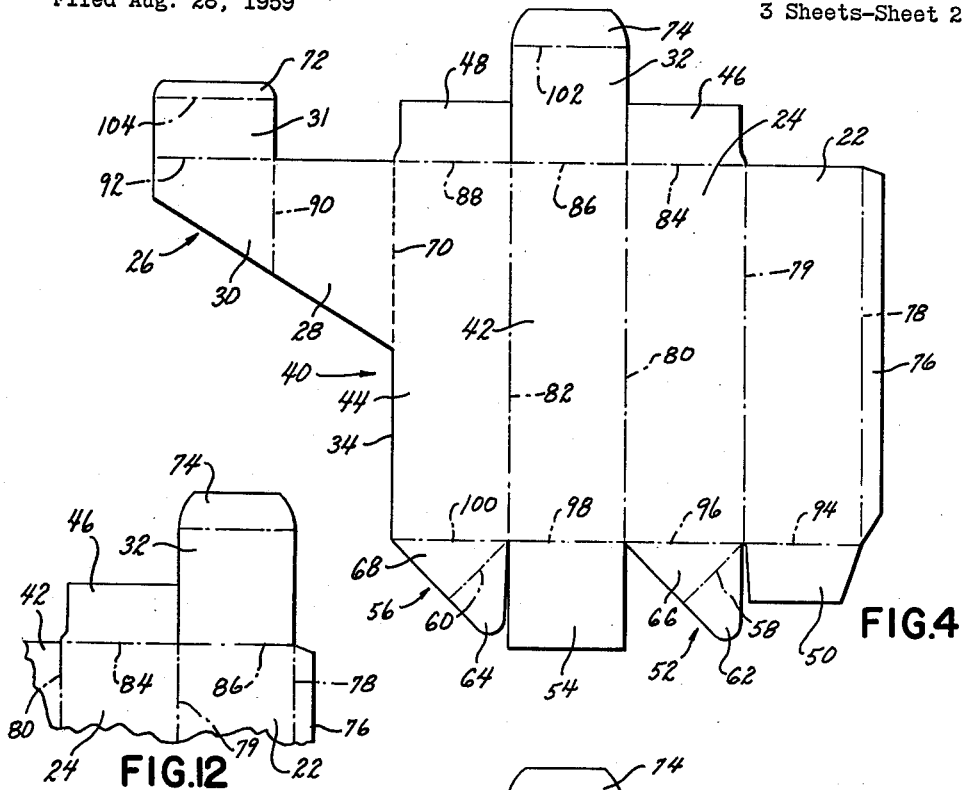
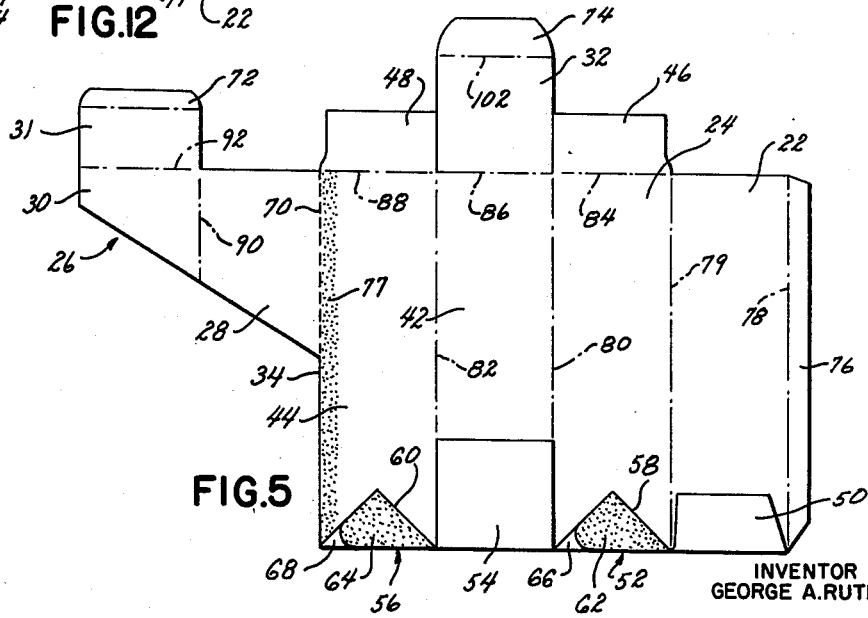
INVENTOR
GEORGE A. RUTLEDGE
BY Glenn & Jackson
HIS ATTORNEYS Nov. 6, 1962 G. A. RUTLEDGE 3,062,430
CARTON WITH DETACHABLE PANEL CONSTRUCTION
Filed Aug. 28, 1959 3 Sheets-Sheet 3

INVENTOR
GEORGE A. RUTLEDGE
BY
Glenn & Jackson
HIS ATTORNEYS

United States Patent Office 3,062,430
Patented Nov. 6, 1962

3,062,430
CARTON WITH DETACHABLE PANEL CONSTRUCTION
George A. Rutledge, Richmond, Va., assignor to Reynolds Metals Company, Richmond, Va., a corporation of Delaware
Filed Aug. 28, 1959, Ser. No. 836,814
4 Claims. (Cl. 229—37)

This invention relates to a carton with a detachable panel construction.

Heretofore, gift cartons, such as used by the alcoholic beverage industry, have been used, which have been provided with a beautiful exterior finish unblemished by any advertising or identifying marks thereon, and over-wrapped by cellophane on which has been printed advertising and/or identification copy. A customer, upon purchasing such a gift carton, has removed the overwrap before presenting the gift.

The present invention overcomes the necessity of an overwrap by printing, or otherwise marking, the advertising and/or identification copy on a detachable panel construction, which may be removed from the beautiful gift carton without marking the same. After the purchaser buys the gift carton, he can remove the detachable panel construction, and then he can present the gift with the beautiful exterior finish of the carton unblemished by any advertising or identification markings.

Hence it is among the objects of this invention to provide a carton, suitable for gift purposes and the like, which may have a beautiful exterior finish unblemished by any advertising and/or identifying marks and which has a detachable panel construction with the advertising and/or identification thereon, which panel construction may be removed from the carton before making the gift to leave the beautiful exterior finish of the carton unblemished by advertising and/or identification copy on it.

Another object of this invention is to provide a carton with a detachable panel construction held tightly against the sides of the carton by means of a top flap that is held in place by the main top closure panel, in a manner not to require the use of adhesives which would tend to deface the carton appearance when the detachable panel construction is pulled off.

Another object of this invention is to provide a carton which may be produced and filled by an uncomplicated operation.

Another object is to provide a carton permitting ease of stripping on a cutter-creaser, so the carton can be glued on a straight line gluer.

Another object is to provide a carton, which may have, if desired, an automatic bottom which is secured in place when the beverage bottle and the like is placed in the carton, such carton also being designed to permit manual operation in erecting the carton and filling it with a bottle or other contents.

Further objects will become apparent as the description proceeds with reference to the accompanying drawings in which:

FIGURE 1 is a view in perspective showing the carton in filled condition, and with the identification panel secured in place.

FIGURE 2 is a view in perspective showing the main top panel lifted, and the identification panel construction torn off of the carton.

FIGURE 3 shows the carton with the top panel returned to its original place, and the carton with its attractive side panels unblemished, and in readiness to be presented as a gift or the like.

FIGURE 4 is a plan view of the carton blank from which the carton and the identification panel may be constructed.

FIGURE 5 is a view somewhat similar to FIGURE 4, but showing the blank partially prepared for further assembly.

FIGURE 12 shows a portion of a carton blank of the character shown in FIGURE 4, but with the main top flap on a different side panel.

Figure 6:
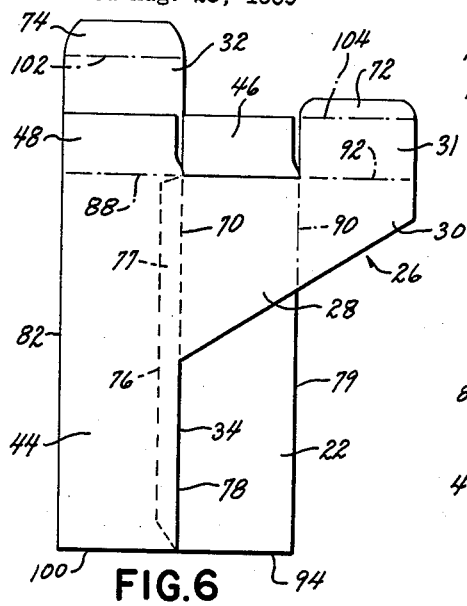
FIGURES 6 through 11 are views in perspective showing the carton in successive stages of erection of the carton.

Certain terms are used in this application for convenience in description, such as " vertical," "top," "bottom," and also for the sake of brevity, it being understood that the members so described may be in other positions than those implied by such terms.

Referring first to FIGURES 1, 2 and 3, the carton 20 is shown with two of its side panels 22 and 24 indicated with brilliant shade marking, such as is produced by aluminum foil covering, colored or uncolored, which is laminated on the cardboard or the like from which these cartons usually are made. The carton 20 is covered by an identification panel construction 26, which may have one or more side identifying panels 28 and 30 and a securing panel 31, FIGURE 2, which is bendable under the main top container forming panel 32, so the side panels 28 and 30 are held tightly against the sides 22 and 24 of the main carton. The identification panel construction 20 later may be placed in condition to be torn off from the main carton construction merely by temporarily lifting the main top carton flap 32, as shown in FIGURE 2, to release the securing panel 31, so the identifying panel construction 26 may be torn off from the tear line 70 of the carton 20. The tear line 70 may be made at end 34 of panel 44, FIGURE 4.

Thereafter the main top flap 32 may be returned to its original position, as shown in FIGURE 3, so the carton is left unblemished with its entire sides 22 and 24, and other sides not shown in FIGURES 1–3, also unblemished by any advertising or identifying copy, such as is shown on the panel construction 26 at 112 and 114. The gift, such as an alcoholic beverage bottle 36, previously has been inserted in the carton, as will become more fully apparent.

FIGURE 4 shows a carton blank from which a carton according to this inevntion may be made, the interior cardboard or similar material surface of the carton blank being shown in FIGURE 4. The blank is generally indicated by the arrow 40 and may include four side wall container forming panels 22, 24, 42, 44, top wall forming panels 46 and 48, which are the shorter top forming panels, and panel 32 which is the long main top panel, and which preferably is the last panel to be folded over at the top. The bottom forming panels are indicated at 50, 52, 54 and 56. The bottom forming panel 50 is relatively short. The panels 52 and 56 are generally triangular and are bendable along the crease lines 58 and 60 respectively, so the end portions 62 and 64 may be bent over the triangular portions 66 and 68 respectively.

The two side panels 22 and 44 may be considered as the end side panels serially joined to the two intermediate side panels 24 and 42.

The carton blank 40 also includes the identification panel construction 26 which has the carton side covering panels 28 and 30 and the upper securing panel or tab 31. The identification panel construction 26 is secured to the panel 44 at the tear line 70, which is deeply cut sufficiently so the identification panel 26 may be torn easily along the tear line 70, which is located along the end 34 of the carton blank which forms the corner of the carton. If desired, the tabs or panels 31 and 32 may be provided with tuck in tabs or tongues 72 and 74 respectively. The panel 22 is provided with a gluing tab or extension 76, which will be glued to the edge of the panel 44 adjacent the corner forming end 34.

The panel 40 may be cut from laminated material which includes a layer of relatively stiff material, such as cardboard or the like of the desired thickness and strength on the top side of FIGURE 4, and has brilliant colored or uncolored foil, such as aluminum containing foil made of commercial aluminum, or suitable alloys thereof on the bottom side of FIGURE 4, and on the outer surface of the finished carton. Such aluminum foil may be in the order of .00035 inch in thickness, by way of example only, and the cardboard may be selected from any of the usual carton forming stocks of suitable weight or thickness as required for the particular use of the carton. The aluminum foil presents a brilliant and beautiful appearance on the outside of the carton when it is ready to be presented as a gift. Such foil may be in natural or colored finish and may be decorated in any manner suitable for gift and other purposes.

The cardboard and foil lamination may be passed through a standard cutter-creaser which cuts and creases the blank to the shape shown in FIGURE 4. Thereafter the blank may be run through a standard straight line gluer which glues the edge 34 as indicated at 77. The ends 62 and 64 are bent along the creases 58 and 60, and their outer sides are coated with glue, as indicated at 62 and 64, FIGURE 5, so that, upon folding of the blank, the end 62 is glued and adhered to the panel 50 and the end 64 is glued to the panel 64.

Thereafter, the panel 22 is folded upon the panel 24 along the bend line 79. Other bend lines on the carton blank are indicated at 78, 80, 82, 84, 86, 88, 90, 92, 94, 96, 98, 100, 102, and 104. The panel 44 is also bent along the bend line 82, so that the glued strip 77 is glued to the tab 76. At this time, the ends 62 and 64 automatically become adhesively secured to the panels 50 and 54 respectively at the bottom of the carton. The folded blank is shown in FIGURE 6.

Blanks may be shipped to the user substantially in the condition shown in FIGURE 6, in packed or boxed condition, as is evident. The user, who is to erect or complete the carton and insert bottles 36 or the like, as indicated in FIGURES 1 and 3, uses the folded cartons of FIGURE 6 as supply material.

Figure 7:
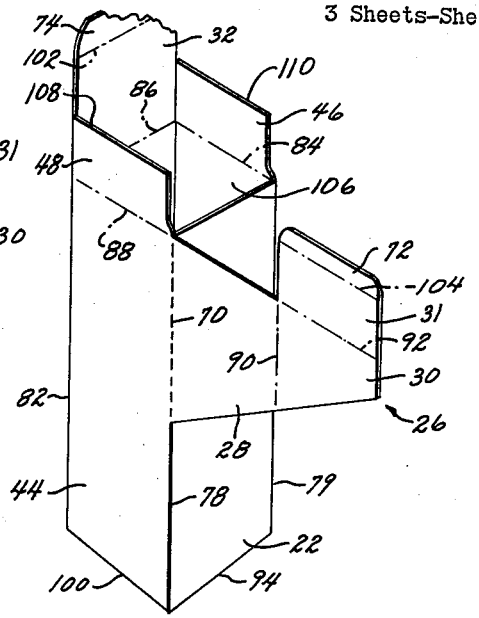

The user pushes together the edges 79 and 82 of FIGURE 6 to start the completion of the carton to advance the assembly to the condition shown in FIGURE 7.

While the blank is being advanced to the condition shown in FIGURE 7, the panels 50 and 62 first are automatically pulled downwardly. Then the panels 64 and 54 are automatically pulled down over the panels 62 and 50, so that eventually the bottom of the carton will be formed automatically with the unfolded panels 62—66 and 64—68 at the lowest surface of the bottom of the carton, and with the panel 50 on top of these panels and finally with the panel 54 on top of the panel 50 to form the top surface of the bottom wall construction. The bottle 32 rests on panel 54 when the bottle is inserted into the opening 106. A somewhat similar use, in a tapered collapsible carton, is more fully shown and described in the patent of Inman, 2,686,002, granted August 10, 1954. The bottom panels in the Inman patent are of a more complicated construction, because of the tapered construction of the Inman carton. The bottom construction in applicant's construction is not as complicated because of applicant's rectangular shape of the sides of the carton. Reference is made to said Inman for further disclosure of the automatic formation of the bottom of the carton, while the carton side walls are being moved from the position of FIGURE 6 to the position of FIGURE 7.

Figure 8:
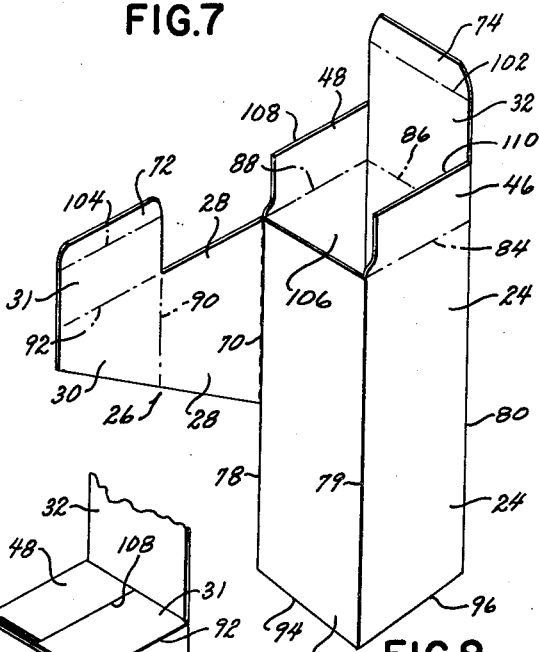

FIGURE 8 shows the carton in the same stage of construction as in FIGURE 7, viewed from another angle.

Figure 10:
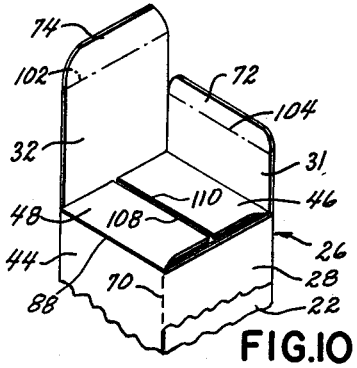
Figure 9:
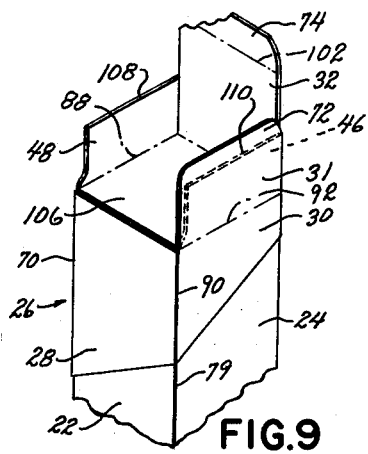
Figure 11:
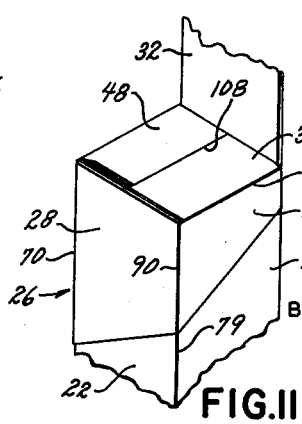

FIGURE 9 shows the identification panel construction 26 folded over the panels of the carton 22 and 24. The securing panel 31 is shown adjacent to the carton top forming wall 46, which is shown in dotted line, in readiness so the panels 31, 46, and 48 may be folded down with the tab 72 ready to be received between the ends 108 and 110 of the panels 48 and 46 respectively. This folding operation, just described, is shown in FIGURES 10 and 11. FIGURE 10 shows the panels 48 and 46 folded down ready to receive the panel 31 and tab 72 within the narrow opening formed by the ends 108 and 110 of the top panels 48 and 46. FIGURE 11 shows the panel 31 folded down and the tab 72 inserted in said narrow opening.

FIGURE 1 shows the carton in completed form, with the identification panel construction 26 securely held by the top panel 32 ready for sale to a user, who, if he so desires, may tear off the identification panel construction 26, as in FIGURE 2, and present the carton as a gift in the attractive condition shown in FIGURE 3.

The foregoing construction may be used for purposes other than as a gift carton, as may be desired and the words "identification panel construction" are used in a broad sense to define a removable panel construction.

FIGURE 12 shows the top forming panel 32 attached to panel 22, instead of to the panel 42. Under these conditions the panel 42 will have no top panel or tab. In either embodiment of FIGURES 1 through 11 or 12, the construction is such that the securing panel 31 of the identification panel construction 26 enters the top of the carton on one side of the top panel 32, so that it may be securely held between the ends of the panels 46 and 48 as previously described.

It is thus seen that a carton may be made from the blank shown in FIGURES 4 or 12, in which the outer surfaces of the main carton, on the outsides of panels 22, 24, 42, and 44, are brilliant and beautiful and provide a carton of attractive appearance suitable for a gift. However, for shipping and retailing purposes, part of the panels 22 and 24 are covered by the identification panel construction 26, may have manufacturer's identification and advertising material thereon, as diagrammatically indicated in FIGURE 1 by the lines 112 and 114. When the purchaser purchases the carton, as shown in FIGURE 1, he pulls up the panel 32, as shown in FIGURE 2, which permits him to pull out the top securing panel 31, together with the panels 28 and 30, which then may be bent outwardly and torn along the tear line 70, after which the top wall panel 32 may be restored to its original condition, as shown in FIGURE 3. The carton in FIGURE 3 is now in suitable condition to be presented as a gift, in which the entire surfaces of the side walls 22, 24, 42, and 44 are brilliantly beautiful and unmarred by any advertising or identification marks.

While the form of the invention now preferred has been disclosed, in accordance with the requirements of the statutes, other forms may be used, all coming within the scope of the claims which follow.

What is claimed is:

1. A carton made from a blank having two end and two intermediate rectangular vertical wall panels serially secured together by bend lines, one of the end panels having a glue tab extension and the other end panel having an identification panel construction secured to its outer edge by a bendable tear score, two alternate of said rectangular vertical panels having short top forming panels to be bent with their ends adjacent to and slightly spaced from each other and a third of said rectangular vertical panels having a long top forming panel to cover the entire top and having a tongue insertable within a top edge of the carton when erected, said identification panel construction having an upper securing panel bendable over one of said short panels, and having a tongue insertable between the ends of said short panels, and being transversely covered by said long top panel.

2. A carton according to claim 1, in which said identification panel construction has two identification panels secured together by a bend line, one of said identification panels being secured by said bendable tear score, and the other of said identification panels having said upper securing panel secured thereto along its upper edge.

3. A carton made from a blank having two end and two intermediate rectangular vertical wall panels serially secured together by bend lines, one of the end panels being secured to the other end panel, one of said end panels having an identification panel construction secured to its outer edge by a bendable tear score, two alternate of said rectangular vertical panels having short top forming panels to be bent with their ends adjacent to each other and a third of said rectangular vertical panels having a long top forming panel to cover the entire top and having a tongue insertable within a top edge of said carton when erected, said identification panel construction having an upper securing panel bendable over one of said short panels, and having a tongue insertable over an edge of one of said short panels, and being transversely covered by said long top panel.

4. A carton container made from a carton blank having side wall, bottom wall and top wall container forming panels separated by bend score lines, an identification panel construction secured to the edge of one of said wall container forming panels by a tear score line, said construction having an identification panel means covering a part of one of said wall container forming panels and having a securing panel bendable under and covered by another of said container forming panels and removable from under said last named container forming panel when said identification panel construction is to be torn off said container along said tear score line, said identification panel means including two identification panels secured together by a bend line, one of said identification panels being secured by said bendable tear score line and the other of said identification panels having said securing panel bendably secured thereto.

References Cited in the file of this patent
UNITED STATES PATENTS

| | | |
|---|---|---|
| 1,943,074 | Heyman | Jan. 9, 1934 |
| 2,054,596 | Ford | Sept. 15, 1936 |
| 2,134,971 | Guyer | Nov. 1, 1938 |
| 2,639,080 | Anderson | May 19, 1953 |
| 2,884,181 | McCormick | Apr. 28, 1959 |